US00RE35697E

United States Patent [19]

Grasso et al.

[11] E Patent Number: Re. 35,697

[45] Reissued Date of Patent: Dec. 23, 1997

[54] UNIT FOR AMPLIFYING LIGHT SIGNALS IN OPTICAL FIBER TRANSMISSION LINES

[75] Inventors: Giorgio Grasso, Monza; Aldo Righetti, Milan, both of Italy

[73] Assignee: Pirelli Cavi S.p.A., Milan, Italy

[21] Appl. No.: 425,390

[22] Filed: Apr. 20, 1995

Related U.S. Patent Documents

Reissue of:

[64] Patent No.: 5,204,923
Issued: Apr. 20, 1993
Appl. No.: 839,056
Filed: Feb. 18, 1992

U.S. Applications:

[63] Continuation of Ser. No. 552,918, Jul. 16, 1990, abandoned.

[51] Int. Cl.[6] ..... G02B 6/28

[52] U.S. Cl. ..... 385/24; 385/32; 385/42; 359/156; 359/195

[58] Field of Search ..... 385/24, 32, 128, 385/129, 141, 27, 31, 39, 42; 359/154, 156, 173, 174, 179, 188, 195

[56] References Cited

U.S. PATENT DOCUMENTS

| | | | |
|---|---|---|---|
| 4,168,427 | 9/1979 | Hubbard et al. | 359/152 |
| 4,596,048 | 6/1986 | Dunki-Jacobs | 455/602 |
| 4,704,741 | 11/1987 | Shikada | 455/612 X |
| 4,879,763 | 11/1989 | Wood | 359/168 |
| 4,899,043 | 2/1990 | Mochiziki et al. | 455/602 X |
| 4,900,917 | 2/1990 | Dixon et al. | 455/601 X |
| 4,947,134 | 8/1990 | Olsson | 455/602 X |
| 5,007,698 | 4/1991 | Sasaki et al. | 385/27 |

FOREIGN PATENT DOCUMENTS

| | | | |
|---|---|---|---|
| 0314373 | 10/1988 | European Pat. Off. | H04B 9/00 |
| 2248370 | 4/1974 | Germany | H04B 9/00 |
| 2291186 | 11/1990 | Japan | H01S 3/06 |
| CS221382 | 9/1982 | U.S.S.R. . | |
| 8607221 | 4/1986 | WIPO . | |

OTHER PUBLICATIONS

OFC Conference (Feb. 1989) TUG7 Saturation–induced crosstalk in high speed erbium–doped amplifiers at λ=1.53 um ECOC '89—15th European Conference on Optical Communication Sep. 10–14, 1989, pp. 42–45 (No Month).

Patent Anstract of Japan, vol 2, No. 33 pp. 12531 JP–A–52 155 901(Nippom Denshin Denwa Kosha), Dec. 1977.

Fain Proceedings, Moscow vol. 172, pp. 79,80,110 no date.

"400 Mbits/s, 372 km Coherent Transmssion Experiment Using IN–Line optical Amplifiers" by Olsson et al. Electronics Letters, vol. 24, No. 1 pp. 36–38, Jan. 1988.

Proceedings of the 15th European Conference on Optical Communications, vol. 3, pp. 42–45 by Righetti et al. "An 11 Gbit/sec 260 km Transmission etc." Sep. 1989.

"Mutual Signal Gain . . . 1.54 um Wavelength" by Inoue et al. Electronics letters, vol. 25, No. 9, pp. 594–595, Apr. 1989.

Patent Abstract of Japan, vol. 13, No. 8 JP–A–63–219 186(Nippon Telegraph & Telephone Corp.), Jan. 1989.

Electronic Letters 13th Apr. 1989 vol. 25 No. 8, pp. 499–501 Improved Sensitivity of 60 Video Channel FM–SCM–Receiver With Semiconductor Etc.

Laser Lichtverstarken und–Oszillatoren, D. Ross, Akademische Verlagsquellschaft Frankfurt am Main 1966 (No Date).

(List continued on next page.)

*Primary Examiner*—Akm E. Ullah
*Attorney, Agent, or Firm*—Brooks Haidt Haffner & Delahunty

[57] ABSTRACT

A unit for amplifying light signals in optical fiber transmission lines includes a fiber optical amplifier to which light signals are transmitted through an input optical fiber line, and from which the signals, after having been amplified, are introduced into an output optical fiber line. First and second optical insulators are interposed between the fiber optical amplifier and the input and output lines to prevent the transmission of optical noise signals from the input and output lines, respectively, to the amplifier.

33 Claims, 1 Drawing Sheet

OTHER PUBLICATIONS

CIC 18.05.1989, NTT Transmission Systems Laboratories, OCS89, No. 6673 pp. 13/36–21/26, vol. 89, No. 32.
Transmission of 12 Gb/s over 100 km Using an LD–pumped Erbium–doped Fiber Amplifier and a Ti:LINb03, Fujitsu Laboratories, Ltd. Date:–Jul. 18, 1989.
Lightguide Digest—1988, No. 2, pp. 8 and 9 (No Month).
IEEE Photonics Technology Letters, vol. 1 No. 3, (Mar. 1989) pp. 68–70.
CLEO vol. 11, (Apr. 24–28, 1989)—Performance Characteristics of Erbium Doped Optical Fiber Amplifiers.
Lexikon der Physik, 1969, pp. 31–32 (No Month).
Optische Nachrichtenchik 1976, pp. 31 and 32 (No Month).
OFC '90 —Jan. 22–26, 1990.
IEEE Journal of Lightwave Technology vol. 7, No. 8 (Aug. 1989) pp. 1234–1240.
Textbook—Optics —pp. 1234–1240 (No Date).
Optical Amplifiers, OFC (Feb. 7, 1989), pp. 345, 363, 369, 370.
Electronics Letters (Sep. 28, 1989) vol. 25, pp. 1393–1394.
"Impact of Multiple Reflection Noise in Gbits/s Lightwave System With Optical Fiber Amplifiers"IEEE Review (Mar. 1989) pp. 107–110.
ECOC('88) "A Travelling–Wave Optical Amplifier Module" Y. Tamura and E. Nishimura (No Month).
Electronics Letters(Mar. 31, 1988), vol. 24, No. 7, pp. 406–408.
Electronics Letters(Jun. 10, 1982), vol. 18 No. 12, pp. 495–496.
Electronics Letters(Sep. 10, 1987) vol. 23, No. 19, pp. 1026–1028.
Electronics Letters, vol. 26, No. 10(May 10, 1990), pp. 669–671.
IEEE Photonics Tech. Letters vol. 2—(Mar. 1990) pp. 211–213.
OFCC Optical Society of America vol. 5, (Feb. 6–Sep. 1989).
TUG 7 Saturation Induced Crosstalk in High–Speed Erbium–doped fiber amplifiers at$\lambda$=1.83 um.
Laser Focus/Electro Optics (May 1985) (pp. 133–135 and 138–144 "Single–Mode Directional Couplers" by Tekippe et al.
OFC Tutorial Sessions (Feb. 1989) pp. 155–158) pp. 155–158; 193–194.
Journal of Lighwave Technology, vol. LT–4 No. 5 (May 1986).
"Effect of Rayleigh Backscattering from Optical Fibers on DFB Laser Wavelengt Laser Diode Modulation and Noise" (1988) pp. 59, 250–255, 284 and 285 (No Month).
Journal of Lightwave Technology, No. 7, No. 6, (Jun. 1989) pp. 888–895.

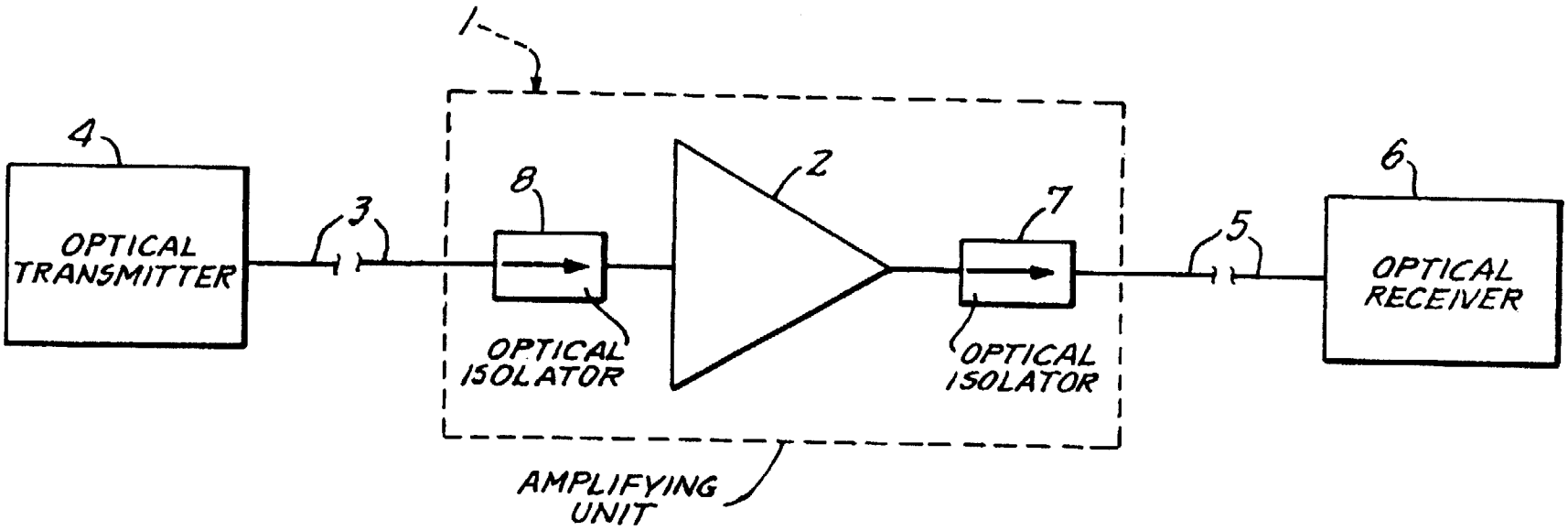
OPTICAL TRANSMITTER
4
3
1
8
OPTICAL ISOLATOR
2
7
OPTICAL ISOLATOR
AMPLIFYING UNIT
5
6
OPTICAL RECEIVER

UNIT FOR AMPLIFYING LIGHT SIGNALS IN OPTICAL FIBER TRANSMISSION LINES

Matter enclosed in heavy brackets [ ] appears in the original patent but forms no part of this reissue specification; matter printed in italics indicates the additions made by reissue.

This application is a continuation of application Ser. No. 07/552,918, filed Jul. 16, 1990 *now abandoned.*

BACKGROUND OF THE INVENTION

1. Field Of The Invention

The present invention generally concerns a unit for amplifying light signals in optical fiber transmission lines, and more specifically, to such a unit which reduces interference and noise in such lines and which is connected between a pair of optical fibers.

2. Description Of The Prior Art

As known, in the optical fiber telecommunications field, owing to the unavoidable losses of light occurring inside optical fibers, a gradual attenuation of the signal always takes place along the path of the optical fibers.

For this reason, when signals have to be transmitted long-distances, it is necessary to use one or more amplifying units which are interposed along the path of the optical fibers at intervals of pre-fixed length.

A type of amplifying unit that at present is in widespread use provides for the use of an optical fiber amplifier which in operation is connected to the optical fibers so as to define, along the path of the latter, an input line through which the signals of light are transmitted to the amplifier itself, as well as an output line through which the amplified signals of light are transmitted in the direction of an optical receiver.

At the present state of the technique, the use of these optical fiber amplifiers gives rise to some drawbacks, deriving mainly from the fact that the amplifier receives not only and exclusively the useful signal to be amplified, but also different noise signals which are consequently amplified and introduced again into the output line.

It is found that a certain number of these noise signals come from the output line and are caused by a phenhomena of diffusion of light unavoidably arising inside the optical fibers.

More precisely, a part of the light forming the amplified signals gets lost as a result of a phenomenon of diffusion arisinq inside the optical fibers.

A part of the back-diffused light returns to the amplifiers and, therefore, is again amplified and introduced into the output line.

Moreover, it is to be considered that the amplifier, owing to its intrinsic nature, emits a certain quantity of noise signals which are introduced either into the input line or into the output line.

Owing to the above phenomena of diffusion, these noise signals partly come back to the amplifier where they mix with the useful signals which it is desired be transmitted.

As it can be understood from the above, the entry of noise signals into the amplifier and their consequent amplification result in interferences and beat phenomena that, for sufficiently high values (>15 dB) of gain of the amplifier, originate an "interferometric noise" of an amplitude greater that the known noise produced by the amplifier.

The above problem results in an undesired reduction of the signal-to-noise ratio between the useful signal and the noise downstream of the amplifier itself. This reduction in the signal/noise ratio tends to increase by increases in the gain of the fiber optical amplifier, as well as by increasing the number of amplifiers arranged along the path of fibers.

In this situation it is extremely difficult to have the useful signal sufficiently clear when it reaches a receiver placed at a long distance from the source of the signal itself.

From Japanese patents 52-155901 and 63-219186 and from "ELECTRONICS LETTERS", vol. 24, no. 1, Jan. 7, 1988, pages 36–38, it is known that in a laser or in an optical semiconductor amplifier there is the risk of instability and generation of oscillations due to the reflections at the amplifier ends.

In the above patents and article, in order to eliminate these reflections, it is taught to couple an optical isolator to the semiconductor laser, which prevents the light reflected by the coupling surfaces between the line fibers and these devices from reaching the lasers themselves.

In an active-fiber amplifier no interface surfaces are present between the line fibers and the amplifier because the line fibers are directly welded to the amplifier's active fiber. Therefore, the reflection phenomena are not generally expected.

It has, however, been discovered that in an active-fiber amplifier, in the absence of means for limiting reflections towards the active fiber, it is impossible to reach high amplification gain due to the occurrence of noise of the interferometric type as a result of beats between the direct and reflected signals in the line fibers themselves and in any event directed towards the active fiber. The presence of interferometric noise is of little importance in a semiconductor amplifier which has low gains and small construction sizes, whereas it becomes particularly important in an active-fiber amplifier capable of reaching very high gain and having an active fiber of considerable length generally in the range of some tens of meters, much greater than the coherence distance of the signal generating laser.

In an optical fiber amplifier the problem arises, therefore, of protecting the amplifying fiber against such noise sources and keeping the reflections towards the active fiber itself below critical values so as not to jeopardize the transmission quality, while maintaining high values of amplification gain.

SUMMARY OF THE INVENTION

The main object of the present invention is to solve the problems of the known technique, by realising an amplifying unit formed in such a way as to considerably prevent the entry of noise signals into the fiber optical amplifier.

This aim and other ones that will be better apparent from the present description, are substantially achieved by means of a unit for amplifying light signals in optical fiber transmission lines, comprising first isolator means for unidirectional light transmission interposed between said amplifier and the output optical fiber line to prevent the transmission of optical noise signals from said output line to the amplifier and second isolator means for unidirectional light transmission between the amplifier and the input line to prevent the transmission of noise signals from the amplifier to said input line.

BRIEF DESCRIPTION OF THE DRAWINGS

Further characteristics and advantages will better appear from the detailed description of a preferred but not exclusive embodiment of a unit for amplifying signals of light in optical transmission lines, according to the present invention. Said description will be made hereinafter with reference to the attached sheet of drawings, supplied only by way of example, which in the single FIGURE shows a block diagram of an amplifying unit forming the object of the present invention arranged to operate along an optical fiber transmission line.

DESCRIPTION OF THE PREFERRED EMBODIMENT

With reference to the FIGURE, reference numeral 1 generally indicates a unit for amplifying signals of light in optical fiber transmission lines according to the invention.

The amplifying unit 1 includes conventionally an optical fiber amplifier 2 arranged to be connected in use to at least an input optical fiber line 3 through which light signals emitted for instance by an optical transmitter 4 or, alternatively, coming from an amplifying unit like that shown and placed upstream of the same, are transmitted.

The amplifier 2 is also connected to an output optical fiber line 5 which convey the amplified light signal to an optical receiver 6 or, alternatively, to another amplifying unit like the shown one.

In accordance with the present invention, the amplifying unit 1 also includes first isolator means 7 for unidirectional light transmission interposed between the fiber optical amplifier 2 and the output optical fiber line 5 to prevent the transmission of optical noise signals from the output line to the amplifier. Moreover, second isolator means 8 for light transmission are interposed between the fiber optical amplifier 2 and the input 3 to prevent the transmission of noise signals from the amplifier 2 to the input line.

Preferably, the isolator means 7, 8 for unidirectional light transmission comprise at least a first optical isolator and at least a second optical isolator, respectively, both isolators having a low reflectivity. It is provided that the reflectivity of these optical isolators 7, 8 known per se, is lower by at least 10 dB with respect to the reflectivity due to Rayleigh scattering in the optical fibers forming the input 3 and output 5 lines.

The operation of the amplifying unit of the present invention will now be described.

In a known way, the amplifier 2 receives the light signals coming from the input line 3 and transmits the amplified signals in the direction of the output line 5.

Besides the aforementioned optical signals, the amplifier 2 also transmits, in a known way, its own noise signals, which tend to be introduced both into the input line 3 and into the output line 5.

Advantageously, the presence of the second optical isolator 8 immediately upstream of the amplifier 2 does not allow the entry of noise signals into the input line 3.

Absent such optical isolator 8, the entry of the amplifier noise signals into the input line 3 would originate, owing to the phenomena of diffusion arising inside the optical fibers, further noise signals, a part of which would again reach the amplifier 2 creating interferences of beats with the useful optical signals, i.e. those transmitted by the optical transmitter 4.

Advantageously, the presence of the first optical isolator 7 immediately downstream of the amplifier 2 additionally avoids noise signals reaching the amplifier 2 produced along the output line 5 as a consequence of the phenomena of diffusion of light arising inside the optical fibers. Absent the first optical isolator 7, these noise signals would be amplified and again introduced into the output line 5 together with the amplified useful signal, thus originating undesired interferences and/or beat phenomena.

From the above it is understood that the only signals that will reach the output line 5 are the amplified useful signals, together with the small noise signal, negligible among other things, produced by the amplifier 2.

The present invention achieves the objects of the invention. In fact, as demonstrated above, due to the presence of the optical isolators immediately upstream and downstream of the amplifier 2, the amplifying unit 1 forming the object of the present invention permits noticeable reduction, in comparison with known techniques, in the entry of noise signals into the output line 5 of the amplifier 2.

This invention increases the useful gain of the amplifier, as well as an improved transmission of the optical signals from a transmitter to a receiver remotely placed at a long distance one from the other.

While a particular embodiment of the present invention has been illustrated and described herein, changes and modification apparent to those skilled in the art may be made therein and thereto, but are included within the scope of the appended claims.

We claim:

1. An optical signal transmission system for transmitting optical signals at a predetermined wavelength from a transmitter to a receiver of such optical signals, at long distance from said transmitter, said system comprising:

a transmitter of optical signals at said predetermined wavelength;

an active fiber amplifier for amplifying signals at said predetermined wavelength and having an input and an output and comprising an active fiber having a predetermined length connected between said amplifier input and output, said amplifier having a gain greater than 15 dB;

a first optical transmission line fiber having a first line fiber input connected to said transmitter of optical signals at said predetermined wavelength and a first line fiber output, said first optical transmission line fiber having a length between said first line fiber input and said first line fiber output greater than said predetermined length of said active fiber and such that optical signals at said predetermined wavelength applied to said first line fiber input are significantly attenuated in travelling from said first line fiber input to said first line fiber output and having a length such that a significant portion of optical signals applied to said first line fiber output are reflected back toward said first line fiber output, due to Rayleigh scattering;

a receiver of optical signals at said predetermined wavelength;

a second optical transmission line fiber having a second line fiber input and having a second line fiber output connected to said receiver of optical signals at said predetermined wavelength, said second optical transmission line fiber having a length greater than said predetermined length of said active fiber and such that a significant portion of optical signals applied to said second line fiber input are reflected back toward said second line fiber input, due to Rayleigh scattering;

first interconnecting means interconnecting said first line fiber output with said input of said active fiber amplifier comprising a first optical isolator optically connected to said first line fiber output and to said input of said active fiber amplifier for supplying optical signals at said first line fiber output to said input of said active fiber amplifier, said first optical isolator being unidirectional for transmitting optical signals substantially only from said first line fiber output to said input of said active fiber amplifier, and said first interconnecting means having a reflectivity lower than the reflectivity due to Rayleigh scattering of said first optical transmission line fiber;

second interconnecting means interconnecting said output of said active fiber amplifier with said second line fiber input, comprising a second optical isolator optically connected to said output of said active fiber amplifier and to said second line fiber input, for supplying optical signals at said output of said active fiber amplifier to said second line fiber input, said second optical isolator being unidirectional for transmitting optical signals substantially only from said output of said active fiber amplifier to said second line fiber input, and said second interconnecting means having a reflectivity lower than the reflectivity due to Rayleigh scattering of said second optical transmission line fiber, whereby reflected optical signals, including optical signals reflected in said first optical transmission line fiber and in said second optical transmission line fiber due to Rayleigh's scattering are substantially prevented from reaching said active fiber.

2. System as set forth in claim 1 wherein the reflectivity of said first optical isolator and said second optical isolator is lower than said reflectivity due to Rayleigh scattering by 10 dB.

3. An optical transmission system as set forth in claim 1 wherein said active fiber has a predetermined length and each of said first optical transmission line fiber and said second optical transmission line fiber is long relative to said predetermined length of said active fiber.

4. An optical transmission system as set forth in claim 3 wherein said predetermined length of said active fiber is greater than the coherence distance of said optical signals at said predetermined wavelength.

5. An optical signal transmission system for transmitting optical signals at a predetermined wavelength from a transmitter to a receiver of such optical signals at long distance from said transmitter, said system comprising:

a transmitter of optical signals at said predetermined wavelength;

an active fiber amplifier for amplifying signals at said predetermined wavelength and having an input and an output and comprising an active fiber having a predetermined length connected to said amplifier input and output, said amplifier having a gain greater than 15 dB;

a receiver of optical signals at said predetermined wavelength;

a first optical transmission line fiber having a first line fiber input at one end thereof connected to said transmitter of optical signals and a first line fiber output at the other end thereof;

first interconnecting means interconnecting said first line fiber output with said active fiber amplifier at said input of the latter;

a second optical transmission line fiber having a second line fiber output at one end thereof connected to said receiver of optical signals and having a second line fiber input at the other end thereof; and second interconnecting means interconnecting said amplifier at the output of the latter with said second line fiber input;

at least one of said first optical transmission line fiber and said second optical transmission line fiber having a length between the input and output thereof greater than said predetermined length of said active fiber and such that optical signals applied to the input thereof are significantly attenuated in traveling from the input to the output thereof and having a length such that a significant portion of optical signals at said predetermined wavelength applied to the other end of said one of said first optical transmission line fiber and said second optical transmission line fiber are reflected back toward said active fiber amplifier due to Rayleigh scattering and the one of said first interconnecting means and said second interconnecting means interconnecting said one of said first optical transmission line fiber and said second optical transmission line fiber with said active fiber amplifier comprising a unidirectional optical isolator which substantially prevents optical signals due to Rayleigh scattering from entering said amplifier while transmitting optical signals at said predetermined wavelength and said one of said first interconnecting means and said second interconnecting means having a reflectivity lower than the reflectivity due to Rayleigh scattering in said one of said first optical transmission line fiber and said second optical transmission line fiber.

*6. An optical signal transmission system for transmitting optical signals in a long distance optical fiber transmission line system comprising:*

*an optical amplifier for amplifying optical signals and having an input and an output;*

*a first optical transmission line fiber having a first end and a second, other end;*

*a second optical transmission line fiber having a second line fiber having a first end and having a second, other end;*

*said amplifier input being optically connected to said first line fiber second end and said amplifier output being optically connected to said second line fiber first end;*

*such optical amplifier being affected by interferometric noise due to interference or beat phenomena and having a gain greater than 15 dB;*

*at least one of said first optical transmission line fiber and said second optical transmission line fiber having a length between the first end and second end thereof such as to have noise signals caused by back diffusion of light arising inside said one line fiber of such intensity as to generate interferometric noise in said optical amplifier and such that a signal in attenuated by travelling from one end to the other end of said one line fiber;*

*a unidirectional optical isolator optically connected in series between said amplifier and said one of said first and second transmission line fibers so as to substantially prevent said noise signals from generating interferometric noise in said optical amplifier while transmitting said optical signals;*

*such unidirectional optical isolator having a reflectivity lower than the reflectivity due to Rayleigh scattering in said one line fiber;*

*and the optical transmission system being such that, in absence of such at least one unidirectional optical isolator, said optical signals and interferometric noise would be transmitted in said second line fiber.*

*7. An optical signal transmission system as set forth in claim 6 in which said isolator has a reflectivity lower by at least 10 dB than the Rayleigh scattering of said one line fiber.*

*8. A system as set forth in claim 6 in which said isolator is optically coupled to one of said amplifier input and output.*

*9. A system as set forth in claim 6 wherein said first line fiber is upstream of said amplifier and said isolator is immediately upstream of said amplifier and prevents noise signals generated in said amplifier from entering said first optical transmission line fiber.*

*10. A system as set forth in claim 6 wherein said second line fiber is downstream of said amplifier and said isolator is present immediately downstream of said amplifier, and prevents noise signals produced in said second line fiber from reaching said amplifier.*

*11. A system as set forth in claim 6 further comprising a second unidirectional optical isolator optically connected in series between said amplifier and the other of said first and second optical transmission line fibers.*

*12. A system as set forth in claim 6 wherein said isolator is optically connected in series with said one line fiber by an optical fiber.*

*13. In an optical transmission system for transmitting optical signals in the direction from a transmitter to a receiver at a long distance from the transmitter, said system including an optical amplifier affected by interferometric noise and having a gain greater than 15 dB and a transmission optical fiber line of a length such that the signal is attenuated as it propagates in said line, said system transmitting said optical signals and interferometric noise in the absence of means for preventing optical signals in said system from propagating in the direction from said receiver to said transmitter, the improvement comprising a unidirectional isolator in said amplifier in a location which prevents propagation of optical signals in the direction from said receiver to said transmitter and allowing signal amplification in said amplifier substantially free from interferometric noise.*

*14. A system as set forth in claim 13 wherein said reflectivity of said optical isolator is lower by at least 10 dB than the reflectivity due to Rayleigh scattering in said transmission optical fiber line.*

*15. A system for transmitting optical signals at a predetermined wavelength from a transmitter of optical signals to a receiver of optical signals distant from said transmitter, said system comprising:*

*a transmitter of optical signals at said predetermined wavelength;*

*a receiver of optical signals at said predetermined wavelength;*

*an optical transmission line fiber having segments thereof coupled in series between said transmitter and said receiver, at least one of said segments having a length such that an optical signal propagated along such length is attenuated in the direction of signal propagation and, due to diffusion phenomena, partially reflected in the direction opposite signal propagation; and*

*a series-connected optical fiber amplifier and optical isolator coupled in series with said optical transmission line fiber, said optical fiber amplifier amplifying signals transmitted therethrough by at least* 15 dB,

*wherein said optical isolator is unidirectional and prevents propagation of optical signals in the direction opposite signal propagation and has a reflectivity lower than the reflectivity due to Rayleigh scattering in said optical transmission line fiber.*

*16. The system of claim 15, wherein said optical isolator is disposed on one side of said optical fiber amplifier, and further comprising a second unidirectional optical isolator in series with said optical transmission line fiber and disposed on the side of said optical fiber amplifier opposite said first-mentioned optical isolator and prevents propagation of optical signals in the direction opposite signal propagation.*

*17. The system of claim 16, wherein said second optical isolator has a reflectivity lower than the reflectivity due to Rayleigh scattering in said optical transmission line fiber.*

*18. Optical amplifying apparatus for amplifying optical signals transmitted at a predetermined wavelength from a transmitter of optical signals through an optical transmission line fiber to a receiver of optical signals distant from said transmitter while coupled in series with said optical transmission line fiber, said optical transmission line fiber having a length such that an optical signal propagated along such length is attenuated in the direction of signal propagation and due to diffusion phenomena, partially reflected in the direction opposite signal propagation, said apparatus comprising a series connected optical fiber amplifier and optical isolator, said optical fiber amplifier amplifying optical signals transmitted therethrough by at least 15 dB, said optical isolator being unidirectional, preventing propagation of signals in the direction opposite signal propagation and having a reflectivity lower than the reflectivity due to Rayleigh scattering of said optical transmission line fiber.*

*19. The apparatus of claim 18 wherein said optical isolator has a reflectivity lower than the reflectivity due to Rayleigh scattering in said optical transmission line fiber by at least 10 dB.*

*20. The apparatus of claim 18 wherein said optical isolator is disposed on one side of said optical fiber amplifier.*

*21. The apparatus of claim 20 further comprising a second optical isolator connected to the side of said optical fiber amplifier opposite said first-mentioned optical isolator and coupled in series with said optical transmission line fiber, said second optical isolator preventing propagation of signals in the direction opposite signal propagation and having a reflectivity lower than the reflectivity due to Rayleigh scattering of said optical transmission line fiber.*

*22. The apparatus of claim 20 wherein said second optical isolator has a reflectivity lower than the reflectivity due to Rayleigh scattering in said optical transmission line fiber by at least 10 dB.*

*23. An optical signal transmission system for receiving optical signals at a predetermined wavelength at a first point and transmitting the optical signals to a second point at a long distance from said first point, said system comprising:*

*an active fiber amplifier at said first point for amplifying signals at said predetermined wavelength and having an input for receiving said optical signals and an output and comprising an active fiber intermediate said amplifier input and output, said amplifier having a gain greater than 15 dB;*

*at least one optical transmission line fiber having a first end and a second end;*

*said at least one transmission line fiber having a length between said first end and said second end such that optical signals applied to said first end thereof are significantly attenuated in travelling from said first end to said second end thereof and having a length such that a significant portion of optical signals at said predetermined wavelength applied to the said first end of said at least one optical transmission line fiber are reflected back toward said active fiber amplifier due to diffusion phenomena; and*

*a unidirectional optical isolator in series with said amplifier and between said amplifier and said at least one*

*line fiber which substantially prevents optical signals due to said diffusion phenomena from entering said amplifier while transmitting optical signals from said amplifier to said at least one line fiber at said predetermined wavelength and said isolator having a reflectivity lower than the reflectivity due to Rayleigh scattering in said at least one optical transmission line fiber.*

*24. A system as set forth in claim 23 wherein said one optical transmission line fiber is upstream of said amplifier and said isolator is immediately upstream of said amplifier and prevents noise signals generated in said amplifier from entering said one optical transmission line fiber.*

*25. A system as set forth in claim 23 wherein said one optical transmission line fiber is downstream of said amplifier and said isolator is present immediately downstream of said amplifier, and prevents noise signals produced in said one line fiber from reaching said amplifier.*

*26. A system as set forth in claim 23 further comprising a second unidirectional optical isolator optically connected in series between said amplifier and the other of said first and second optical transmission line fibers.*

*27. A system as set forth in claim 23 wherein said isolator is optically connected in series with said one line fiber by an optical fiber.*

*28. An optical amplifier having an input and an output for amplifying useful telecommunication light signals received at said input with a gain greater than 15 dB, said amplifier producing interferometric noise when optical signals enter said amplifier while said amplifier is supplying amplified light signals corresponding to said useful telecommunication light signals and interferometric noise to said output without a unidirectional isolator preventing propagation of light signals in the direction from said output to said input, the improvement comprising a unidirectional isolator in series with said amplifier, said isolator preventing propagation of optical signals in the direction from said output to said input.*

*29. A method of improving signal-to-noise ratio between a useful signal and noise downstream of an optical amplifier in an optical transmission system, in which useful optical signals are transmitted from a first point to a second point at a long distance from said first point over at least one optical fiber line and are amplified by an optical amplifier, and in which the length of said at least one optical fiber line and type and gain of said optical amplifier and such that interferometric noise originates in said optical amplifier by reason of optical signals caused by diffusion phenomena in said at least one optical fiber entering said optical amplifier, said optical amplifier amplifying and transmitting amplified said useful signal, which method comprises preventing said optical signals caused by said diffusion phenomena from entering said amplifier.*

*30. A method as set forth in claim 29 wherein said optical signals caused by diffusion phenomena are prevented from entering said amplifier by a unidirectional isolator intermediate said amplifier and said second point and nearer said amplifier than said second point.*

*31. A method as set forth in claim 29 wherein said optical signals caused by diffusion phenomena are prevented from entering said amplifier by a unidirectional isolator intermediate said amplifier and said first point and nearer said amplifier than said first point.*

*32. A method as set forth in claim 29 wherein said optical signals caused by diffusion phenomena are prevented from entering said amplifier by a unidirectional first isolator intermediate said amplifier and said second point and nearer said amplifier than said second point and a second isolator intermediate said amplifier and said first point and nearer said amplifier than said first point.*

*33. In a method for transmitting useful optical signals over a long distance, comprising:*

*transmitting said useful optical signals in a transmission line including an optical fiber, in one direction from a first end to a second end of said line at a long distance from said first end; and*

*supplying said useful signals in an optical amplifier intermediate said first end and said second end,*

*in which said transmission line length and said amplifier type and gain are such that, in absence of unidirectional optical isolators, interferometric noise would be originated in the amplifier, while said useful signals would be transmitted, the improvement comprising the step of:*

*preventing optical signals from creating interferences and beat phenomena in the amplifier with said useful signals, whereby signal-to-noise ratio is increased downstream the amplifier.*

* * * * *